Jan. 24, 1956   E. G. ANDERSON   2,731,941
WARNING SIGNAL FOR A CHART HOLDER
Filed June 1, 1954   2 Sheets-Sheet 1
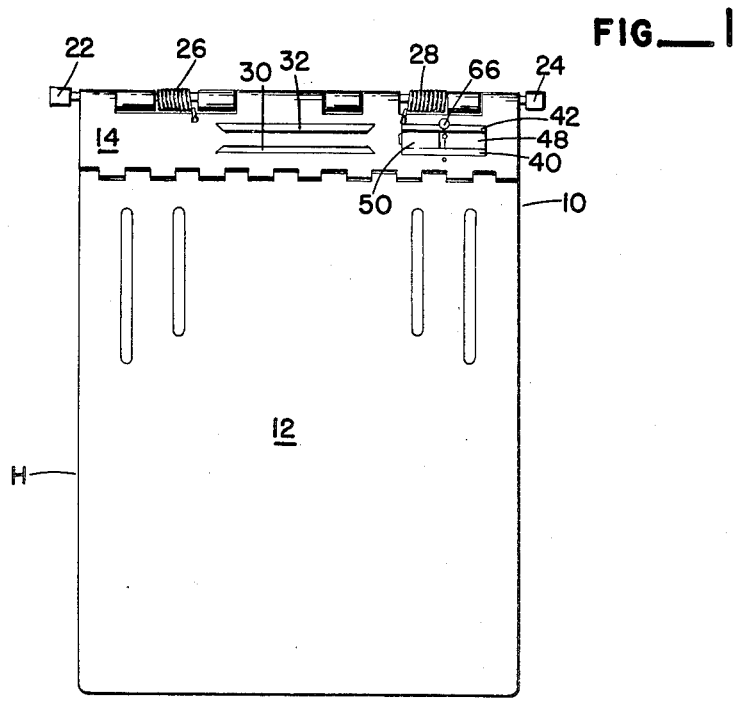
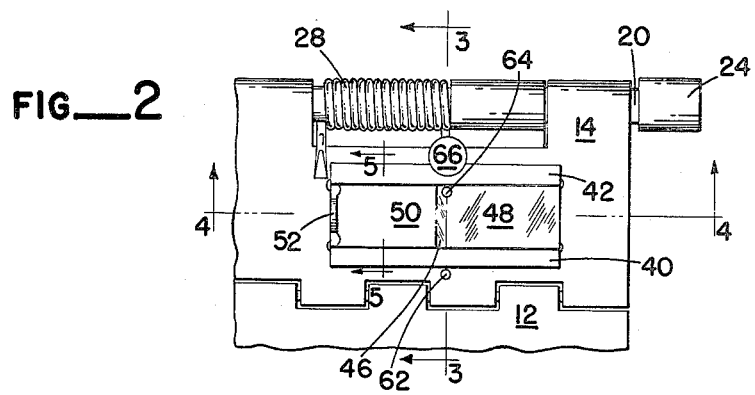
ELSIE G. ANDERSON
*INVENTOR.*

Jan. 24, 1956  E. G ANDERSON  2,731,941
WARNING SIGNAL FOR A CHART HOLDER
Filed June 1, 1954  2 Sheets—Sheet 2
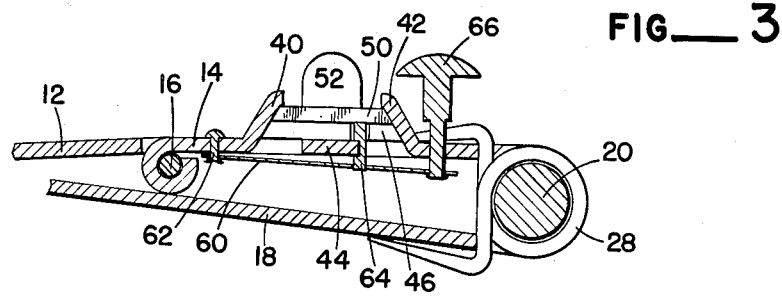
FIG.—3
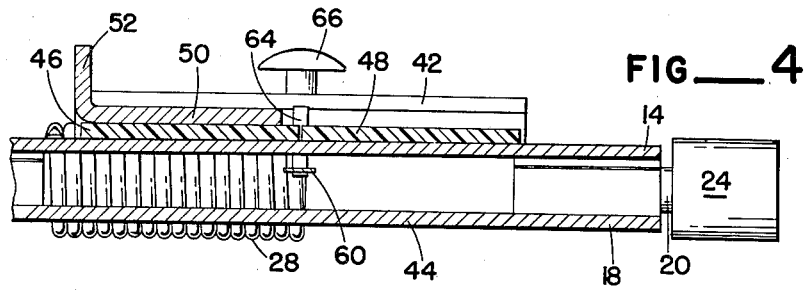
FIG.—4
FIG.—5
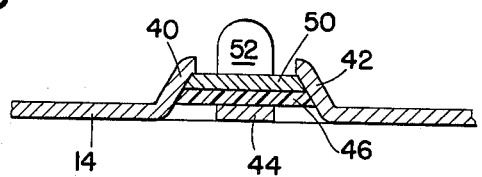
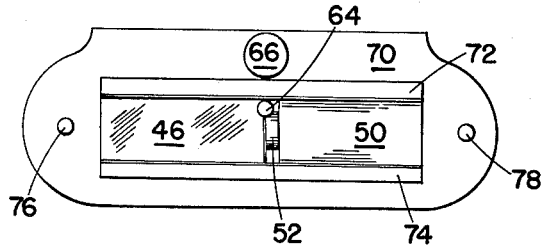
FIG.—6
ELSIE G. ANDERSON
*INVENTOR.*
BY Smith + Tuck

United States Patent Office 2,731,941
Patented Jan. 24, 1956

2,731,941

WARNING SIGNAL FOR A CHART HOLDER

Elsie G. Anderson, Seattle, Wash.

Application June 1, 1954, Serial No. 433,466

4 Claims. (Cl. 116—135)

My invention relates to hospital chart holders and more particularly to a warning signal for a chart holder. The signal includes a pair of contrastingly colored surfaces on the face of the holder and a sliding plate guided to cover one or the other of these colored surfaces to indicate that the holder contains doctor's orders.

The charts of patients in a hospital are commonly kept in metal chart holders in the office of each ward. One time-consuming task of the nurses is to go through all of the folders in the office periodically to determine if the doctors have left orders of prescriptions and treatment for the patients.

The objects of my invention include therefore: to devise a warning signal on the cover of a chart holder which is manually operable to form visual indicia as to the presence of doctor's orders in the holder; to provide such warning signal which is readily visible, which is safeguarded against accidental displacement, and which is durable and economical to provide on the standard type chart holder.

My invention will be best understood, together with additional advantages and objectives thereof, from a reading of the following description, read with reference to the drawings, in which:

Figure 1 is a face view of a chart holder showing a specific embodiment of my warning signal;

Figure 2 is an enlarged, fragmentary face view of the signal device;

Figure 3 is a view taken on line 3—3 of Figure 2 on an enlarged scale and partially in section;

Figure 4 is an enlarged sectional view taken on line 4—4 of Figure 2;

Figure 5 is an enlarged sectional view taken on line 5—5 of Figure 2; and

Figure 6 is a face view of a modified form of the signal device.

The chart holder H is of standard construction including the cover 10 which is divided into a long bottom section 12 and a short upper section 14 which has a hinged connection 16. A full-sized back 18 forms a hinged connection with top section 14 by a rod 20 having at its ends resilient rests 22, 24 of a large size serving as hangers and supporting the top of the holder in movement across a table to avoid scratching. Wound around rod 20 is a pair of coiled springs 26, 28, spring biasing top section 14 and back 18 together to clamp a chart between the hinge 16 and back 18. A holder for the patient's name plate is formed on top section 14 by guides 30, 32.

A track is formed at the right hand corner of top section 14 by a pair of parallel spaced-apart lips 40, 42, struck out from the material forming cover 10. Positioned on web 44, left between lips 40, 42 is a pair of contrastingly colored, high light-reflective plates 46, 48, which are preferably beveled at their edges to the contour of lips 40, 42. These may be synthetic crystalline plates and one colored red, and the other white, to indicate respectively the presence or absence of doctor's orders.

A sliding plate 50 is mounted on top of plates 46, 48, to move from a first position covering plate 46 to a second position covering plate 48. The sliding plate has an upstanding lug 52 for convenient manual operation of the same and has beveled edges conforming to the inner surfaces of lips 40, 42. By these means holder H will show at a glance whether or not the chart contains new orders of the doctor; and, if the signal is exposed on the upper right hand corner of the chart holder, the signal is plainly visible as the holder hangs in the conventional chart rack. When the doctor writes a new order he pushes sliding panel 50 over the white colored surface, as 46, revealing a red surface, as 48. When the nurse takes care of the doctor's orders, she pushes the panel over the red surface exposing the white one.

A spring blade 60 is secured on the under surface of upper section 14 as by rivets 62 and has secured to its intermediate portion an upstanding stop pin 64 which is normally biased by the blade to an upper position between colored plates 46, 48, blocking passage of sliding plate 50 from one position to the other. A push button 66 is secured to the other end of spring blade 60 and is manually depressible to move stop pin 64 to a lower position permitting sliding plate 50 to pass. A necessary feature of the signaling device is accuracy and it is important to provide these stop means so that the sliding panel 50 cannot be pushed to one side accidentally without definite pressure on button 66.

The construction shown in Figure 6 is identical to that of the other figures except that, instead of the track being formed from the material of top section 14, a separate plate 70 is provided having lips 72, 74, to support the colored plates and the sliding plate. Plate 70 is secured to the upper corner of the chart holder H by rivets 76, 78.

A necessary characteristic of this signaling device is that it must be sturdy and capable of withstanding the hard usage that chart holders undergo in the daily routine of the hospital. It will be seen that spring blade 60 and associated parts are protected in their position under upper section 14. Likewise the parts exposed on the top of the holder H are adequately protected by lips 40, 42. Colored plates 46, 48 may be removed when worn and sliding plate 50 may be slightly upwardly bowed in its center to minimize scratching of the colored plates.

Having thus described my invention, I wish to be understood as not limiting myself to the exact structure shown but wish to cover those modifications which will occur to those skilled in the art, as defined by the appended claims.

I claim:

1. A warning signal for a metal hospital chart holder of the type having a cover divided into a short top section and a long bottom section hingedly connected together and having a back with a spring loaded hinged connection to the top section for clamping charts therebetween, comprising: a track at a corner of said top section formed by a pair of parallel spaced apart lips struck out from the material forming said top section and tending to converge as they extend outwardly from the plane of said top section, a pair of contrastingly colored, high light reflective plates positioned side by side between said lips, a sliding plate mounted on top of said colored plates and guided by said lips and manually movable along said track from a first position covering one colored plate to a second position covering the other colored plate, a spring blade secured at one end to the under surface of said upper section, an upstanding stop pin secured to said spring blade intermediate its ends and normally biased by the blade to an upper position between said colored plates blocking passage of said sliding plate between said first and second positions, an opening through said top section and a push button mounted in said opening and secured to the other end of said spring blade and manually depressible to move said stop pin to a lower position permitting said sliding plate to pass.

2. A warning signal for a metal hospital chart holder of the type having a cover divided into a short top section and a long bottom section hingedly connected together and having a back with a spring loaded hinged connection to the top section for clamping charts therebetween, comprising: a track formed on said top section by a pair of parallel spaced apart lips, a pair of contrastingly colored plates positioned side by side between said lips, a sliding plate mounted on top of said colored plates and guided by said lips and manually movable along said track from a first position covering one colored plate to a second position covering the other colored plate, a spring blade secured at one end to the under surface of said upper section and an upstanding stop pin secured to said spring blade and normally biased by the blade to an upper position between said colored plates blocking passage of said sliding plate between said first and second positions, and a push button mounted in said top section and manually operable to depress said stop pin against the action of said spring blade to permit said sliding plate to pass said stop pin.

3. A warning signal for a metal hospital chart holder of the type having a cover divided into a short top section and a long bottom section hingedly connected together and having a back with a spring loaded hinged connection to the top section for clamping charts therebetween, comprising: a pair of juxtaposed surfaces of contrasting colors positioned on the face of said upper section, track means on said upper section, a sliding plate mounted in said track means and manually movable between a first position covering one of said colored surfaces and a second position covering the other of said colored surfaces, and a stop normally positioned to block movement of said plate between said positions and manually operable means for moving said stop to a position permitting such movement of said plate.

4. A warning signal for a metal hospital chart holder of the type having a cover divided into a short top section and a long bottom section hingedly connected together and having a back with a spring loaded hinged connection to the top section for clamping charts therebetween, comprising: a pair of juxtaposed surfaces of contrasting colors positioned on the face of said upper section, track means on said upper section, and a sliding plate mounted in said track means and manually movable between a first position covering one of said colored surfaces and a second position covering the other of said colored surfaces, and manually displaceable stop means normally operable to block movement of said plate between said positions.

References Cited in the file of this patent

UNITED STATES PATENTS

| | | |
|---|---|---|
| 955,325 | Dawson | Apr. 19, 1910 |
| 1,734,898 | Conrad | Nov. 5, 1929 |
| 2,669,964 | Wexler | Feb. 23, 1954 |